(12) United States Patent
Guerin et al.

(10) Patent No.: US 7,030,193 B2
(45) Date of Patent: Apr. 18, 2006

(54) NITRITE COMPOSITIONS

(75) Inventors: Frederic Guerin, Port Athur, TX (US); Carl Walter Von Hellens, Brights Grove (CA); Sharon X. Guo, Sarnia (CA)

(73) Assignee: Bayer Inc., Sarnia (CA)

( * ) Notice: Subject to any disclaimer, the term of this patent is extended or adjusted under 35 U.S.C. 154(b) by 0 days.

(21) Appl. No.: 10/873,910

(22) Filed: Jun. 22, 2004

(65) Prior Publication Data

US 2005/0101736 A1    May 12, 2005

(30) Foreign Application Priority Data

Jun. 26, 2003    (CA) ................................ 2433497

(51) Int. Cl.
*C08F 8/14*     (2006.01)
*C08K 5/02*     (2006.01)

(52) U.S. Cl. .............. 525/329.3; 525/194; 525/222; 525/224; 525/328.3; 525/329.2; 525/359.5; 525/368; 525/369

(58) Field of Classification Search ............ 525/194, 525/197, 328.3, 329.2, 329.3, 359.5, 359.6, 525/368, 369, 222, 224
See application file for complete search history.

(56) References Cited

U.S. PATENT DOCUMENTS

| 2,504,295 | A | * | 4/1950 | Beaver ................. 525/329.3 |
| 3,063,961 | A | * | 11/1962 | Frank ...................... 525/213 |
| 3,067,180 | A | * | 12/1962 | Miller et al. ............ 525/329.3 |
| 3,910,863 | A | * | 10/1975 | Bowman .................. 525/346 |
| 6,057,014 | A | | 5/2000 | Fuller ..................... 428/35.7 |
| 6,416,834 | B1 | | 7/2002 | Fuller ..................... 428/35.7 |
| 6,657,014 | B1 | | 12/2003 | Mori et al. ............ 525/329.3 |
| 2003/0176549 | A1 | | 9/2003 | Campomizzi et al. ...... 524/431 |

OTHER PUBLICATIONS

Hawley's Condensed Chemical Dictionary (11th ed.), Van Nostrand Reinhold, N.Y., 613-614, 1987.*
English language translation of Japanese Published Examined Application S59-2696, Patented Date: Jan. 20, 1984.*
Z.N. nudelman et al.: "Vulcanisation of a liquid carboxyl-containing polybutadiene with halogeno-organic compounds" International Polymer Science and Technology., vol. 1, No. 4, 1974, p. T/27, XP002298232 GBRAPRA Technologies, Shropshire. *abstract; table*.

* cited by examiner

*Primary Examiner*—Fred Teskin
(74) *Attorney, Agent, or Firm*—Jennifer R. Seng

(57) ABSTRACT

The present invention relates to a polymer composite containing at least one carboxylated nitrile rubber polymer, that is optionally hydrogenated, at least one basic compound, at least one polyhalogenated hydrocarbon, optionally at least one filler and optionally at least one cross-linking agent, a process for preparing said polymer composite wherein at least one carboxylated nitrile rubber polymer, that is optionally hydrogenated, at least one basic compound, at least one polyhalogenated hydrocarbon, optionally at least one filler and optionally at least one cross-linking agent are mixed and a shaped article containing diester bridges formed by reaction of at least one carboxylated nitrile rubber polymer, that is optionally hydrogenated, at least one basic compound and at least one polyhalogenated hydrocarbon.

9 Claims, 1 Drawing Sheet

NITRITE COMPOSITIONS

FIELD OF THE INVENTION

The present invention relates to a polymer composite containing at least one carboxylated nitrile rubber polymer, that is optionally hydrogenated, at least one basic compound, at least one polyhalogenated hydrocarbon, optionally at least one filler and optionally at least one cross-linking agent, a process for preparing said polymer composite wherein at least one carboxylated nitrile rubber polymer, that is optionally hydrogenated, at least one basic compound, at least one polyhalogenated hydrocarbon, optionally at least one filler and optionally at least one cross-linking agent are mixed and a shaped article containing diester bridges formed by reaction of at least one carboxylated nitrile rubber polymer, that is optionally hydrogenated, at least one basic compound and at least one polyhalogenated hydrocarbon.

BACKGROUND OF THE INVENTION

Hydrogenated nitrile rubber (HNBR), prepared by the selective hydrogenation of acrylonitrile-butadiene rubber (nitrile rubber; NBR, a co-polymer comprising at least one conjugated diene, at least one unsaturated nitrile and optionally further comonomers), is a specialty rubber which has very good heat resistance, excellent ozone and chemical resistance, and excellent oil resistance. Coupled with the high level of mechanical properties of the rubber (in particular the high resistance to abrasion) it is not surprising that NBR and HNBR have found widespread use in the automotive (seals, hoses, bearing pads) oil (stators, well head seals, valve plates), electrical (cable sheating), mechanical engineering (wheels, rollers) and shipbuilding (pipe seals, couplings) industries, amongst others.

SUMMARY OF THE INVENTION

The present invention relates to polymer composites containing at least one carboxylated nitrile rubber polymer, that is optionally hydrogenated, at least one basic compound, at least one polyhalogenated hydrocarbon, optionally at least one filler and optionally at least one cross-linking agent. It is preferred that the NBR is fully or partially hydrogenated ("HNBR"). The present invention also relates to polymer composites containing at least one hydrogenated carboxylated nitrile rubber polymer, at least one basic compound, at least one polyhalogenated hydrocarbon, optionally at least one filler and optionally at least one cross-linking agent.

In addition, the present invention relates to a process for preparing said polymer composite wherein at least one hydrogenated carboxylated nitrile rubber polymer, at least one basic compound, at least one polyhalogenated hydrocarbon, optionally at least one filler and optionally at least one cross-linking agent are mixed.

Further, the present invention relates to a shaped article containing diester bridges formed by reaction of at least one carboxylated nitrile rubber polymer, that is optionally hydrogenated, at least one basic compound and at least one polyhalogenated hydrocarbon.

DETAILED DESCRIPTION OF THE INVENTION

Figure 1:
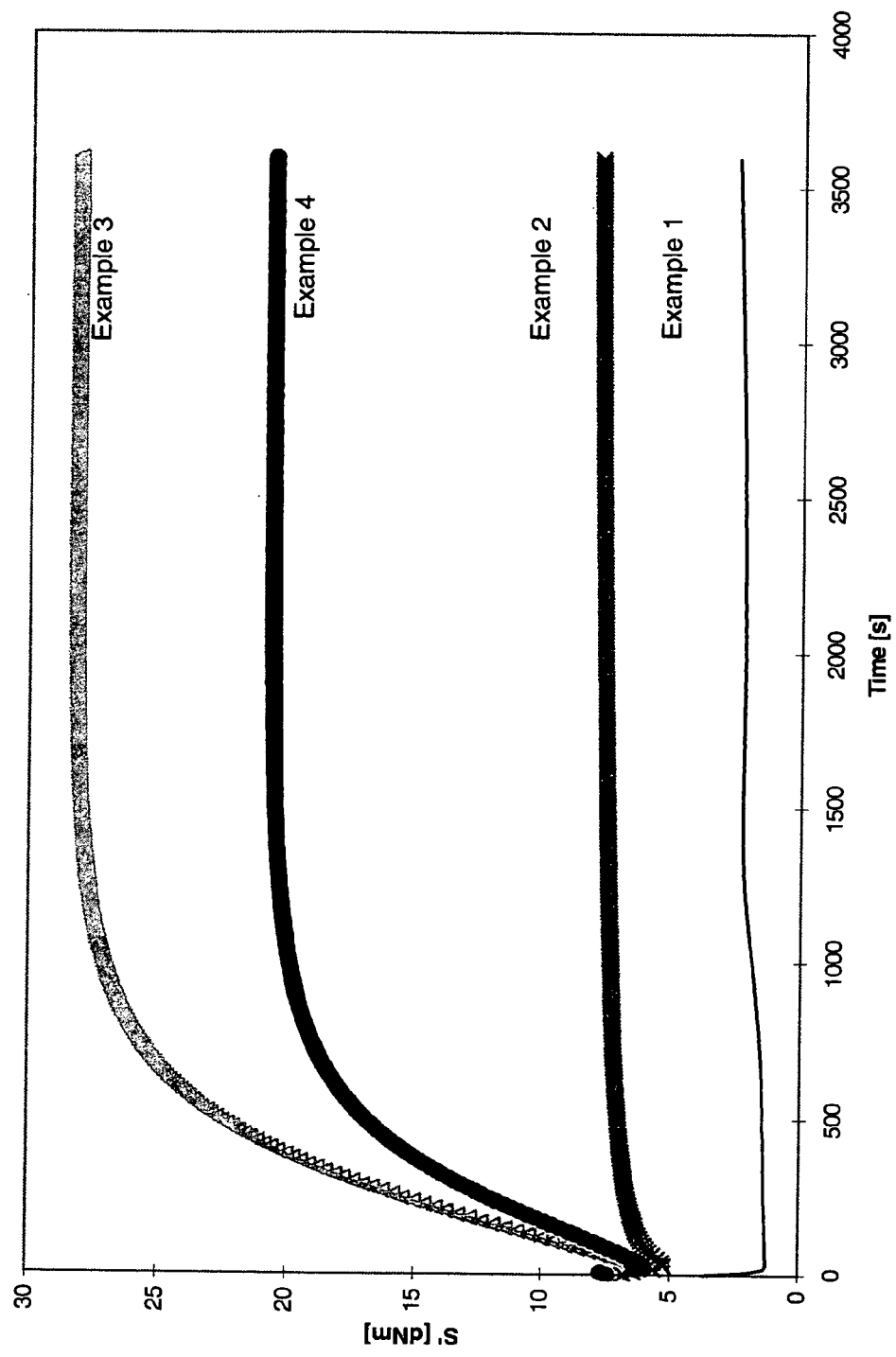
FIG. 1. illustrates the torque (S') in dN.m for the first hour of curing at 1° arc and 160° C. of the compounds of Examples 1–4.

As used throughout this specification, the term "nitrile polymer" or NBR is intended to have a broad meaning and is meant to encompass a copolymer having repeating units derived from at least one conjugated diene, at least one alpha-beta-unsaturated nitrile, at least one monomer having a carboxylic group and optionally further one or more copolymerizable monomers.

The conjugated diene may be any known conjugated diene, in particular a $C_4$–$C_6$ conjugated diene. Preferred conjugated dienes are butadiene, isoprene, piperylene, 2,3-dimethyl butadiene and mixtures thereof. Even more preferred $C_4$–$C_6$ conjugated dienes are butadiene, isoprene and mixtures thereof. The most preferred $C_4$–$C_6$ conjugated diene is butadiene.

The alpha-beta-unsaturated nitrile may be any known alpha-beta-unsaturated nitrile, in particular a $C_3$–$C_5$ alpha-beta-unsaturated nitrile. Preferred $C_3$–$C_5$ alpha-beta-unsaturated nitrites are acrylonitrile, methacrylonitrile, ethacrylonitrile and mixtures thereof. The most preferred $C_3$–$C_5$ alpha-beta-unsaturated nitrile is acrylonitrile.

The monomer having at least one carboxylic group may be any known monomer having at least one carboxylic group being copolymerizable with the nitrile and the diene.

Preferred monomers having at least one carboxylic group are unsaturated carboxylic acids. Non-limiting examples of suitable unsaturated carboxylic acids are fumaric acid, maleic acid, acrylic acid, methacrylic acid and mixtures thereof.

Preferably, the copolymer contains in the range of from 40 to 85 weight percent of repeating units derived from one or more conjugated dienes, in the range of from 15 to 60 weight percent of repeating units derived from one or more unsaturated nitriles and in the range of from 0.1 to 15 weight percent of repeating units derived from one or more monomers having at least one carboxylic group. More preferably, the copolymer contains in the range of from 55 to 75 weight percent of repeating units derived from one or more conjugated dienes, in the range of from 25 to 40 weight percent of repeating units derived from one or more unsaturated nitrites and in the range of from 1 to 7 weight percent of repeating units derived from one or more monomers having at least one carboxylic group.

Optionally, the copolymer may further contain repeating units derived from one or more copolymerizable monomers, such as alkylacrylate, styrene. Repeating units derived from one or more copolymerizable monomers will replace either the nitrile or the diene portion of the nitrile rubber and it will be apparent to the skilled in the art that the above mentioned figures will have to be adjusted to result in 100 weight percent.

Hydrogenated in the present invention is preferably understood by more than 50% of the residual double bonds (RDB) present in the starting nitrile polymer/NBR being hydrogenated, preferably more than 90% of the RDB are hydrogenated, more preferably more than 95% of the RDB are hydrogenated and most preferably more than 99% of the RDB are hydrogenated.

The present invention is not restricted to a special process for preparing the hydrogenated carboxylated NBR. However, the HXNBR preferred in this the present invention is readily available as disclosed in WO-01/77185-A1. For jurisdictions allowing for this procedure, WO-01/77185-A1 is incorporated herein by reference.

The XNBR as well as the HXNBR which forms a preferred component of the polymer composite of the present invention can be characterized by standard techniques known in the art. For example, the molecular weight distribution of the polymer can be determined by gel permeation chromatography (GPC) using a Waters 2690 Separation Module and a Waters 410 Differential Refractometer running Waters Millennium software version 3.05.01. Samples can be dissolved in tetrahydrofuran (THF) stabilized with 0.025% BHT. The columns useful for the determination include three sequential mixed-B gel columns from Polymer Labs. Reference Standards can be polystyrene standards from American Polymer Standards Corp.

The present inventive polymer composite further contains at least one basic compound. The basic compound is not restricted and any known basic compound that under the conditions typically used for rubber mixing is capable of abstracting the proton from the carboxylic group(s) of the monomer having at least one carboxylic group is suitable. Non-limiting examples include alkali metal hydroxides (e.g. LiOH, NaOH, KOH) and alkaline earth metal hydroxides (e.g. Ca (OH)$_2$, Mg (OH)$_2$,), alkaline earth metal oxides (e.g. MgO, ZnO, CaO), alkali metal carbonates and bicarbonates (e.g. Na$_2$CO$_3$, K$_2$CO$_3$, NaHCO$_3$). Usually, part of the basic compound will form a salt with the polymer (e.g. a Na-salt) under the conditions typically used for rubber mixing.

In a typical rubber mixing procedure, the ingredients of the final polymer composite are mixed together, suitably at an elevated temperature that may range from 25° C. to 150° C. Normally the mixing time does not exceed one hour and a time in the range from 2 to 30 minutes is usually adequate. The mixing can be suitably carried out in an internal mixer such as a Banbury mixer, or a Haake or Brabender miniature internal mixer. A two roll mill mixer also provides a good dispersion of the additives within the elastomer. An extruder also provides good mixing, and permits shorter mixing times.

The present inventive polymer composite further contains at least one polyhalogenated hydrocarbon. The polyhalogenated hydrocarbon is not restricted and any known polyhalogenated hydrocarbon is capable of reacting with the polymer salt formed by part of the basic compound and the polymer and thus creating a diester bridge between two polymer chains. Non-limiting examples include dihaloalkanes, dihaloalkenes, dihaloaryls.

Preferred polyhalogenated hydrocarbons include 1,10-dibromodecane, 1,6-dibromohexane and 1,3-dibromopropane.

It may be advantageous to use polyhalogenated hydrocarbons with one or more additional reactive groups including but not limited to halogens (e.g. trihalohydrocarbons) to increase the formation of ester bridges and thus increase the crosslinking density.

The present inventive polymer composite further optionally contains at least one filler. The filler may be an active or an inactive filler or a mixture thereof. The filler may be:

highly dispersed silicas, prepared e.g. by the precipitation of silicate solutions or the flame hydrolysis of silicon halides, with specific surface areas of in the range of from 5 to 1000 m$^2$/g, and with primary particle sizes of in the range of from 10 to 400 nm; the silicas can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas in the range of from 20 to 400 m$^2$/g and primary particle diameters in the range of from 10 to 400 nm;

natural silicates, such as kaolin and other naturally occurring silica;

glass fibers and glass fiber products (matting, extrudates) or glass microspheres;

carbon blacks; the carbon blacks to be used here are prepared by the lamp black, furnace black or gas black process and have preferably BET (DIN 66 131) specific surface areas in the range of from 20 to 200 m$^2$/g, e.g. SAF, ISAF, HAF, FEF or GPF carbon blacks;

rubber gels, especially those based on polybutadiene, butadiene/styrene copolymers, butadiene/acrylonitrile copolymers and polychloroprene; or mixtures thereof.

Examples of preferred mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the rubber. For many purposes, the preferred mineral is silica, more preferably silica made by carbon dioxide precipitation of sodium silicate. Dried amorphous silica particles suitable for use in accordance with the present invention may have a mean agglomerate particle size in the range of from 1 to 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasile® S and Vulkasil® N, from Bayer AG.

Often, use of carbon black as a filler is advantageous. Usually, carbon black is present in the polymer composite in an amount of in the range of from 20 to 200 parts by weight, preferably 30 to 150 parts by weight, more preferably 40 to 100 parts by weight. Further, it might be advantageous to use a combination of carbon black and mineral filler in the present inventive polymer composite. In this combination the ratio of mineral fillers to carbon black is usually in the range of from 0.05 to 20, preferably 0.1 to 10.

The polymer composite may advantageously further contain other natural or synthetic rubbers such as BR (polybutadiene), ABR (butadiene/acrylic acid-C$_1$–C$_4$-alkylester-copolymers), CR (polychloroprene), IR (polyisoprene), SBR (styrene/butadiene-copolymers) with styrene contents in the range of 1 to 60 wt %, NBR (butadiene/acrylonitrile-copolymers with acrylonitrile contents of 5 to 60 wt %, HNBR with a Mooney viscosity (ML 1+4@ 100° C. according to ASTM test D1646) of at least 30 (partially or totally hydrogenated NBR-rubber), EPDM (ethylene/propylene/diene-copolymers), FKM (fluoropolymers or fluororubbers), olefin-vinylacetate-copolymers (e.g. LEVAPREN®), olefin-vinylacrylate-copolymers (e.g. VAMAC®) and mixtures of the given polymers. Careful blending with conventional HNBR often reduces cost of the polymer composite without sacrificing the processability. The amount of conventional HNBR and/or other natural or synthetic rubbers will depend on the process condition to be applied during manufacture of shaped articles and is readily available by few preliminary experiments.

The polymer composite furthermore optionally contain one or more cross-linking agents or curing systems. The present invention is not limited to a special curing system, however, peroxide curing system are preferred. Furthermore, the present invention is not limited to a special peroxide curing system. For example, inorganic or organic peroxides are suitable. Preferred are organic peroxides such as dialkylperoxides, ketalperoxides, aralkylperoxides, peroxide ethers, peroxide esters, such as di-tert.-butylperoxide, bis-(tert.-butylperoxyisopropyl)-benzene, dicumylperoxide, 2,5-dimethyl-2,5-di(tert.-butylperoxy)-hexane, 2,5-dimethyl-2,5-di(tert.-butylperoxy)-hexene-(3), 1,1-bis-(tert.-butylperoxy)-3,3,5-trimethyl-cyclohexane, benzoylperoxide, tert.-butylcumylperoxide and tert.-butylperbenzoate. Usually the amount of peroxide in the polymer composite is in the range of from 1 to 10 phr (=per hundred rubber), preferably from 4 to 8 phr. Subsequent curing is usually performed at a temperature in the range of from 100 to 200° C., preferably 130 to 180° C. Peroxides might be applied advantageously in a polymer-bound form. Suitable systems are commercially available, such as Polydispersion T(VC) D-40 P from Rhein Chemie Rheinau GmbH, D (=polymer-bound di-tert.-butylperoxy-isopropylbenzene).

The rubber composition according to the present invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. Preferably the composition contains in the range of 0.1 to 20 phr of an organic fatty acid as an auxiliary product, preferably a unsaturated fatty acid having one, two or more carbon double bonds in the molecule which more preferably includes 10% by weight or more of a conjugated diene acid having at least one conjugated carbon-carbon double bond in its molecule. Preferably those fatty acids have in the range of from 8–22 carbon atoms, more preferably 12–18. Examples include stearic acid, palmitic acid and oleic acid and their calcium-, zinc-, magnesium-, potassium- and ammonium salts. Preferably the composition contains in the range of 5 to 50 phr of an acrylate as an auxiliary product. Suitable acrylates are known from EP-A1-0 319 320, in particular p. 3, l. 16 to 35, from U.S. Pat. No. 5,208,294, see Col. 2, l. 25 to 40, and from U.S. Pat. No. 4,983,678, see Col. 2, l. 45 to 62. Reference is made to zinc acrylate, zinc diacrylate or zinc dimethacrylate or a liquid acrylate, such as trimethylolpropanetrimethacrylate (TRIM), butanedioldimethacrylate (BDMA) and ethylenglycoldimethacrylate (EDMA). It might be advantageous to use a combination of different acrylates and/or metal salts thereof. Such as, metal acrylates in combination with a Scorch-retarder such as sterically hindered phenols (e.g. methyl-substituted aminoalkylphenols, preferably 2,6-di-tert.-butyl-4-dimethylaminomethylphenol).

The ingredients of the final polymer composite can be mixed together, suitably at an elevated temperature that may range from 25° C. to 200° C. Normally the mixing time does not exceed one hour and a time in the range from 2 to 30 minutes is usually adequate. The mixing is suitably carried out in an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage, but that the conditions are suitable for the desired esterification process involving polymer, basic compound and polyhalogenated hydrocarbon. For compounding and vulcanization see also: Encyclopedia of Polymer Science and Engineering, Vol. 4, p. 66 et seq. (Compounding) and Vol. 17, p. 666 et seq. (Vulcanization).

This process provides thermally resistent flexible cross-linking between the polymer chains. This new cross-linking system may be used in applications where a carboxylated polymer is used such as rolls, seals, belts o-rings.

Furthermore, the present invention provides a shaped article containing the inventive polymer composite having diester bridges. Preferred shaped articles include a seal, hose, belt, roller, bearing pad, stator, well head seal, valve plate, cable sheating or pipe seal.

Furthermore, the present inventive polymer composite is very well suited for wire and cable production.

EXAMPLES

Example 1–4

Polymer composites were mixed in a brabender miniature internal mixer in a single mixing step (all ingredients included at the start of the procedure, 6 minutes mix cycle, 55 rpm, start temperature 30° C., max temperature 125° C.). The formulations used in this assessment are based on a simplified recipe according to Table 1.

Armeen™ 18d is octadecylamine available from AkzoNobel and is used to reduce compound stickiness to metal.

TABLE 1

Compounding Recipe

| Example | 1 (Comp.) | 2 (Comp.) | 3 | 4 |
|---|---|---|---|---|
| Therban XT 8889 (BayerAG) | 100 | 100 | 100 | 100 |
| Armeen 18d | 0.5 | 0.5 | 0.5 | 0.5 |
| 1,10-dibromodecane (Aldrich) | 5 | | 5 | 2.5 |
| NaOH (Aldrich) | | 2.5 | 2.5 | 2.5 |

Polymer Composites Properties

Table 2 shows a summary of the properties of polymer composites of Exp. 1–4. Examples 1–2 are for comparison. MDR Cure Properties (160° C., 10 arc, 1.7 Hz, 60 minutes). The complete graphs for the torque are shown in FIG. 1.

TABLE 2

MDR Cure Properties

| Example | 1 | 2 | 3 | 4 |
|---|---|---|---|---|
| Maximum Torque (MH, dN.m) | 2.57 | 7.88 | 28.75 | 20.7 |
| Minimum Torque (ML, dN.m) | 1.27 | 5.26 | 6.2 | 6.01 |
| Delta MH-ML (dN.m) | 1.3 | 2.62 | 22.55 | 14.6 |

The Delta MH-ML gives an indication of the crosslinking density. It is clear from examples 3–4 that the presence of both a base (e.g. NaOH) and a polyhalogenated hydrocarbon (e.g. 1,10-dibromodecane) is required. The presence of both components results in a significant increased in cure density.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymer composite comprising at least one hydrogenated carboxylated nitrile rubber polymer, at least one basic compound, at least one polyhalogenated hydrocarbon, optionally at least one filler and optionally at least one cross-linking agent.

2. A composite according to claim 1 wherein the basic compound is an alkali metal hydroxide, oxide, carbonate or bicarbonate or an alkaline earth metal hydroxide, oxide or carbonate.

3. A composite according to claim 1 wherein the polyhalogenated hydrocarbon is a polyhalogenated alkane, polyhalogenated alkene, or polyhalogenated aryl.

4. A composite according to claim 3 wherein the polyhalogenated hydrocarbon is a dibromoalkane.

5. A composite according to claim 1 wherein the polymer composite comprises a peroxide, resin or sulfur curing system.

6. A composite according to claim 1 wherein the polymer composite further comprises at least one polymer selected from the group consisting of NBR, HNBR, olefin-vinylacrylate-copolymers and olefin-vinylacetate-copolymers.

7. A process for preparing a polymer composite according to claim 1 comprising mixing at least one hydrogenated, carboxylated nitrile rubber polymer, at least one basic compound, at least one polyhalogenated hydrocarbon, optionally at least one filler and optionally at least one cross-linking agent.

8. A shaped article comprising at least one, optionally hydrogenated, carboxylated nitrite rubber polymer crosslinked by diester bridges.

9. A shaped article according to claim 8, wherein the article is a seal, hose, belt, roller, bearing pad, stator, well head seal, valve plate, cable sheating or pipe seal.

* * * * *